United States Patent [19]

Church

[11] Patent Number: 4,920,801
[45] Date of Patent: May 1, 1990

[54] ACCELEROMETER

[75] Inventor: Peter D. Church, Harrow, United Kingdom

[73] Assignee: The Marconi Company Limited, England

[21] Appl. No.: 222,138

[22] Filed: Jul. 21, 1988

[30] Foreign Application Priority Data

Jul. 29, 1987 [GB] United Kingdom ............... 8718004

[51] Int. Cl.⁵ ............................................ G01P 15/08
[52] U.S. Cl. ................................. 73/517 R; 73/517 B
[58] Field of Search ..................... 73/505, 510, 517 R, 73/517 B

[56] References Cited

U.S. PATENT DOCUMENTS

| | | | |
|---|---|---|---|
| 4,342,227 | 8/1982 | Peterson et al. | 73/510 |
| 4,679,434 | 7/1987 | Stewart | 73/517 B |
| 4,736,629 | 4/1988 | Cole | 83/517 R |
| 4,803,883 | 2/1989 | Shutt | 73/517 B |
| 4,809,552 | 3/1989 | Johnson | 73/517 R |

FOREIGN PATENT DOCUMENTS 62-118260  5/1987  Japan ..................................... 73/514

OTHER PUBLICATIONS

"A Miniature Integrated Circuit Accelerometer", L. M. Roylance et al., IEEE Int'l Solid–State Ckts. Conf., San Francisco, Calif., 15–17 Feb. 1978.

Primary Examiner—John Chapman
Attorney, Agent, or Firm—Kirschstein, Ottinger, Israel & Schiffmiller

[57] ABSTRACT

An accelerometer capable of sensing acceleration in three orthogonal directions while being formed in a single silicon wafer comprises three cantilever beams (2) etched from the wafer, each having a mass (3) asymmetric to the neutral plane (A) of the beam, and formed by etching away the beam (2) on one face only of the wafer. The beams are arranged at 120° to each other so that their sensing axes (S) are orthogonal or approximately so. Deflection of the beams is measured by piezoelectric, electrostatic or electrodynamic effect and force feedback is preferably employed, again using one of these effects.

22 Claims, 5 Drawing Sheets

ACCELEROMETER

BACKGROUND OF THE INVENTION

There is a variety of accelerometers available for use in inertial navigation. A typical device is a force feedback accelerometer using, for example, a coil and magnetic field for providing the force feedback and a variable capacitance for sensing deflection to provide an input to the force feedback system. A device of this sort is composed of many parts made from different materials and is consequently expensive to make, difficult to miniaturise, and prone to differential expansion effects which will adversely affect its performance.

These problems can be large overcome by making the accelerometer from a wafer of silicon using the technology of integrated circuit manufacture. There are however other problems to be overcome, in the application of IC technology to accelerometer manufacture. Typically, for integrated circuits, a large number of copies of one circuit are made on one silicon wafer. The wafer is then cut up to form individual circuit chips which are mounted from one face and provided with contact pads on the opposite face.

For many applications of accelerometers the acceleration to be sensed is in an unknown direction, so it is common to use three accelerometers mounted with their sensing axes mutually orthogonal. it would be extremely difficult to mount accurately orthogonal three miniature silicon devices, which are typically only about 0.4 mm thick. Even if this could be achieved, there would be difficulty in making connections to the devices using standard IC equipment since this is designed for mounting and connecting devices having a mounting face and a parallel connection face. Clearly, two accelerometers with orthogonal sensing axes, can be made in the plane of the wafer, but a third would require its sensing axis normal to the wafer.

SUMMARY OF THE INVENTION

An object of this invention is to produce an accelerometer which largely overcomes these problems.

According to the present invention, an accelerometer comprises a plurality of cantilever mounted beams, a longitudinal surface of each beam lying in a common plane, the mass distribution of each beam transverse to the surface being such that each beam has a sensing axis, along which the beam is preferentially responsive to acceleration, the sensing axis being inclined to the common plane, the orientation of the beams in the common plane being such that the sensing axes of the beams in the common plane being such that the sensing axes of the beams are aligned with a set of co-ordinate axes, and including sensing means in respect of each beam to determine the acceleration-induced beam deflection.

The beams are preferably integral parts of a semiconductor wafer, one surface of the wafer lying the common plane.

Each beam may comprise a support-end section and a substantially thicker free-end section. Again, each beam may comprise a support-end section and a free-end section of substantially greater width across the longitudinal surface. There are preferably three beams and the co-ordinate axes are preferably mutually orthogonal. The sensing means may comprise, in respect of each beam, means for transmitting a surface acoustic wave along the longitudinal surface, and means for timing the transmission of the surface acoustic wave and determining a change in the time of transmission resulting from a change in length of the longitudinal surface resulting from deflection of the beam. The means for transmitting a surface acoustic wave may comprise a layer of piezoelectric material deposited on the longitudinal surface, a transmitting electrode system and a receiving electrode system spaced apart along the longitudinal surface to define a surface acoustic wave path.

Alternatively, the sensing means may comprise, in respect of each beam, a capacitor electrode mounting on the longitudinal surface, a fixedly mounted capacitor electrode, and means responsive to the capacitance between the electrodes.

Again, the sensing means may comprise, in respect of each beam, an inductive coil mounted on the longitudinal surface, a fixedly mounted inductive coil confronting the beam mounted coils, and means responsive to the electromagnetic coupling between the coils. The accelerometer preferably includes forcefeedback means associated with each beam responsive to the sensing means to tend to maintain zero deflection of the associated beam, an output signal from the force feedback means providing an indication of acceleration.

The force feedback means may comprise, in respect of each beam, a composite deposit on said longitudinal surface, comprising a first electrode layer, a layer of piezoelectric material and a second electrode layer, and means for applying a potential difference between the first and second electrodes such as to impose a longitudinal stress of the longitudinal surface to oppose stress imposed by acceleration-induced deflection of the beam.

The force feedback means may comprise, in respect of each beam. A capacitor electrode mounted on the longitudinal surface, a fixedly mounted capacitor electrode and means for applying a potential difference between them.

Alternatively, the force feedback may comprise, in respect of each beam, an inductive coil mounted on the longitudinal surface, a fixedly mounted inductive coil and means for energising them.

BRIEF DESCRIPTION OF THE DRAWINGS

Embodiments of the invention will now be described by way of example, with reference to the accompanying drawings, of which:

FIGS. 2(a) and (b) show the development of a beam such as those shown in FIG. 1;

FIGS. 10(a) and (b) show plan and longitudinal section views of a beam having an integral end-stop.

DETAILED DESCRIPTION OF THE PREFERRED EMBODIMENTS

Figure 1:
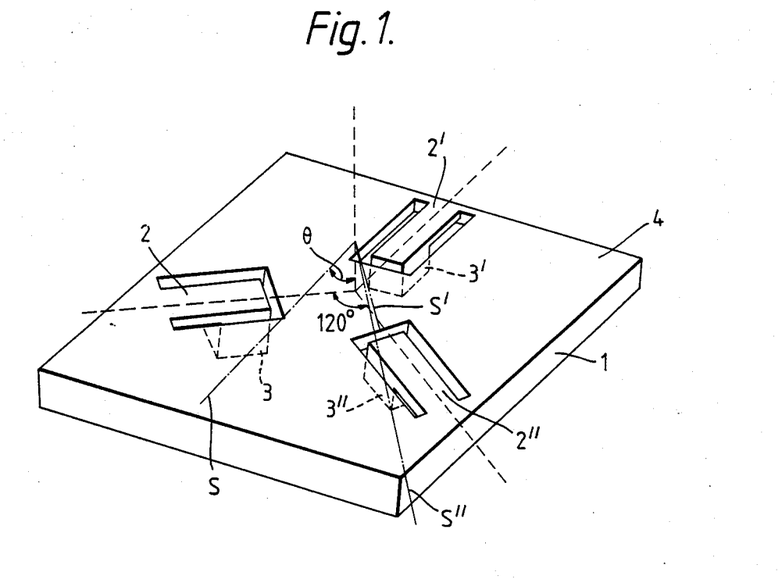
FIG. 1 is a perspective view of a triaxial accelerometer incorporating cantilever-mounted beams.

Referring to FIG. 1, a wafer of silicon 1 about 0.4 mm thick is etched to form three cantilever beams 2, 2', 2" each formed with an offset end mass 3, 3', 3" within the thickness of the wafer. The beams are symmetrically disposed at 120° to each other in the plane of the wafer. The upper surface 4 of the wafer is planar; no part of the beams protrudes above the surface, so the associated circuitry can be deposited on the surface 4 by conventional integrated circuit techniques. Under acceleration, the beams deflect, maximum deflection of a given beam occurring when the acceleration is along one particular axis, defined as the beam's sensing axis, 5', or 5". Measurement of this deflection gives a measurement of the acceleration.

Figures 2A, 2B:
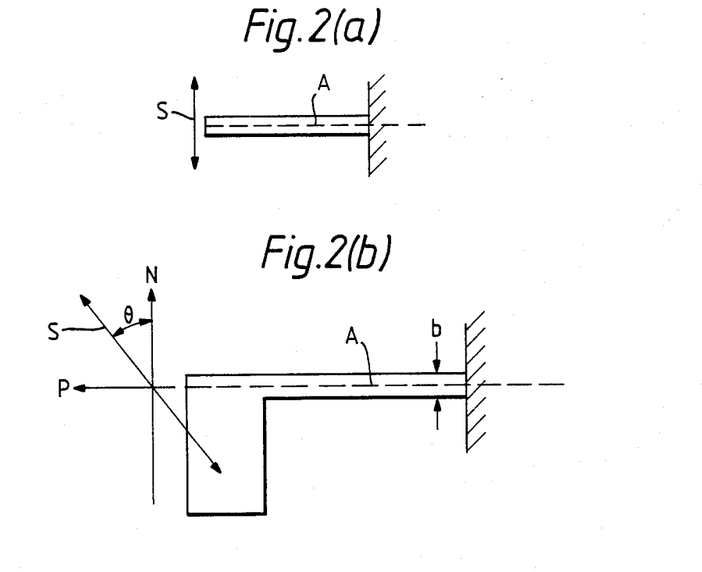

For a uniform beam, as shown in side view in FIG. 2(a) the sensing axis S is normal to the longitudinal axis A, i.e. normal to the wafer surface 4. The sensing axis is shifted from the normal by adjusting the beam's dimensions so that its mass is distributed asymmetrically above and below the axis A. Maximum response to a given acceleration, and thus greatest sensitivity, is obtained by concentrating the offset mass at the end of the beam remote from the support, as in FIG. 2(b). The beam depth b is typically 50 $\mu$m.

Figure 3:
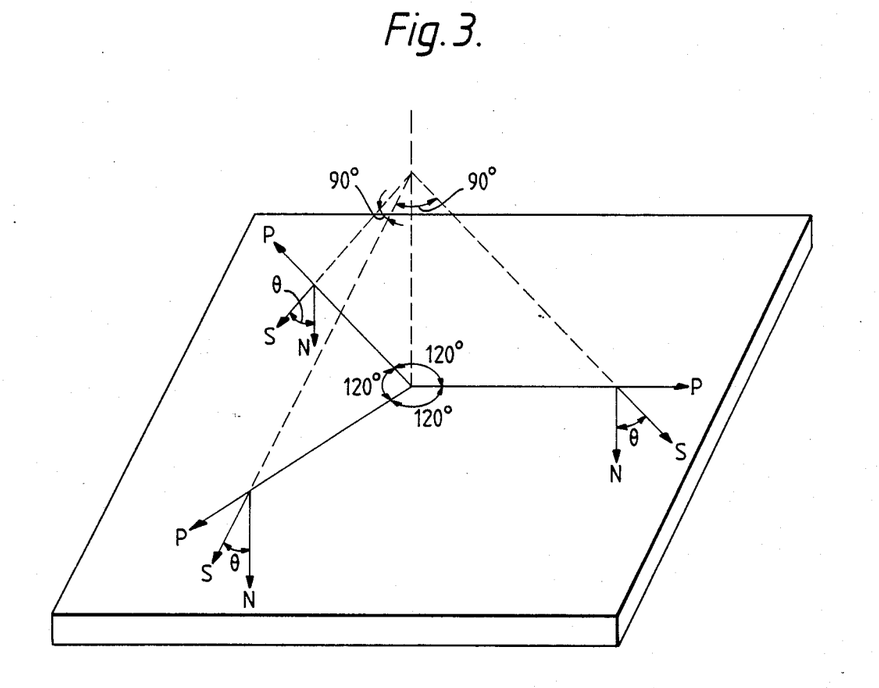
FIG. 3 shows the geometry of the accelerometer axes.
Figures 4A, 4B, 4C:
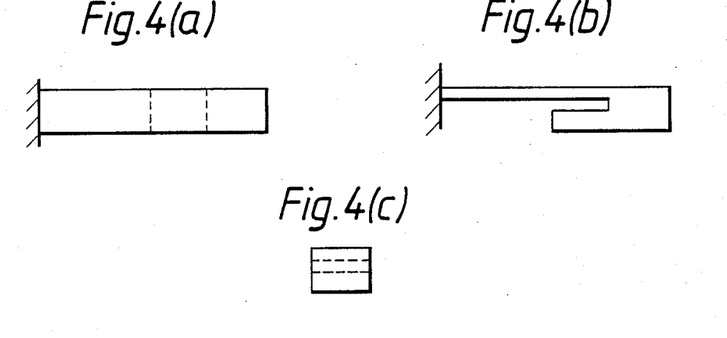
FIGS. 4a–4c, 5a–5c, 6a and 6b show examples of alternative beam shapes.
Figure 5A:
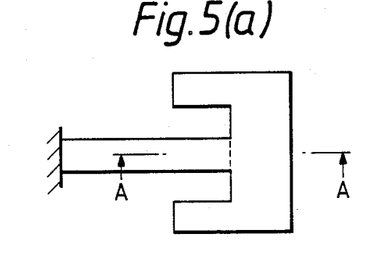
Figures 5B, 5C:
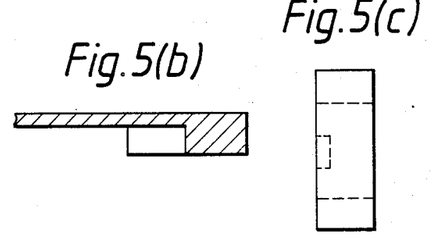
Figure 6A:
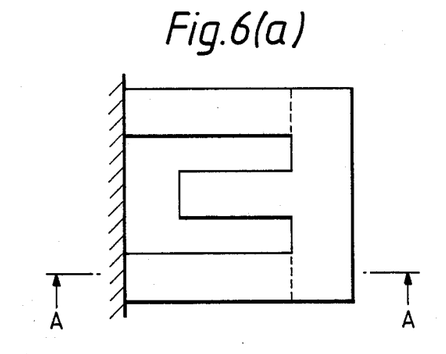
Figure 6B:
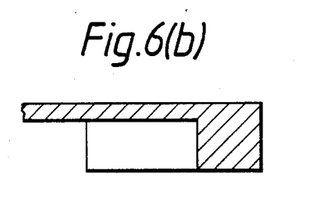

The sensing direction S can be resolved into components normal to and in the plane of the wafer surface, N and P respectively. If three accelerometers are made with their in-plane components P at 120° to each other, then for the three sensing directions to be mutually orthogonal the beams should be so designed that their sensing axes are at an angle $\theta = \tan^{-1}\sqrt{2}$ ($\approx 55°$) to the normal to the plane of the wafer. This arrangement is shown in FIG. 1 and, more clearly in FIG. 3. The result is an accelerometer, omni-directionally responsive, embodied in a single wafer. It will of course be appreciated that, while the symmetrical arrangement of FIGS. 1 and 3 best illustrates the orthogonal result, the three beams could be positioned anywhere in the plane of the wafer as long as their relative directions are maintained. Thus a row of three beams is quite satisfactory and probably preferable. This may be seen as one of the beams of FIG. 1 being moved across the plane to a position between the other two.

It will be appreciated that, while orthogonal sensing axes as derived above is the most practical arrangement in operation, an arrangement in which the sensing axes are less than orthogonal can still be accommodated by suitable processing electronics.

An offset mass on a simple beam is easy to manufacture, but it is by no means the only suitable geometry. FIGS. 4a–4c, 5a–5c, 6a and 6b show various alternative beam shapes. The beam shown in FIGS. 4a–4c could not easily be etched, so would be more difficult and expensive to make, but those shown in FIGS. 5a–5c, 6a and 6b are suitable for etching from a silicon wafer since all surfaces are outwardly exposed. In certain cases the mass asymmetry could be achieved within a uniform beam, by density variation.

The deflection caused by acceleration can be measured in two different ways. The loaded beam may be allowed to deflect a device such as a spring which exerts a restoring force proportional to deflection, and the restoring force measured. However, because the mass follows a curved path the measuring direction should vary similarly with acceleration. This cannot easily be done, so this approach is not suitable for applications requiring high accuracy. Alternatively, a feedback force may be applied, adjustable to hold the beam at very nearly its initial position, and the feedback force measured. A force feedback system requires more complicated circuitry than a simple deflection measuring system, but is generally more accurate. Which system is chosen will depend on a combination of factors, including manufacturing requirements.

Figure 7:
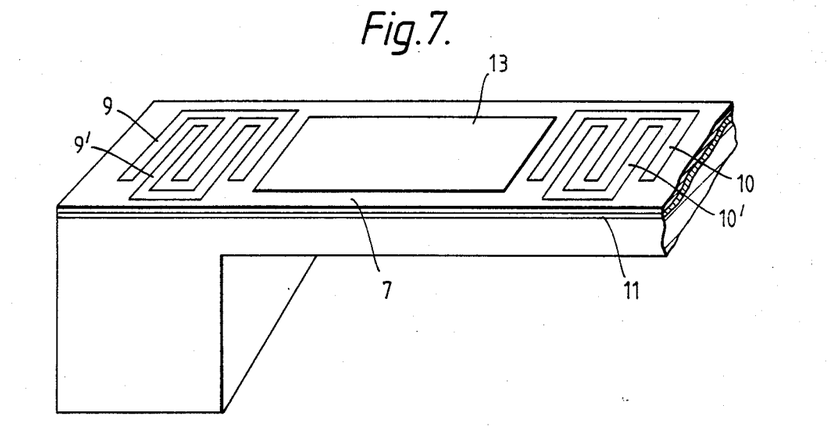
FIG. 7 shows an accelerometer beam adapted for acoustic wave (SAW) sensing and piezoelectric force feedback.

Various methods can be used for either purpose, that is, to measure deflection, and to provide the feedback force. FIG. 7 shows an arrangement for measuring deflection using stress waves—high frequency surface acoustic waves (SAW's), generated in piezoelectric material. A layer 7 of zinc oxide or other piezoelectric material about 5 $\mu$m thick is deposited on the beam surface and two pairs of electrodes 9, 9' and 10, 10' are then deposited on the zinc oxide. The surface acoustuc waves are generated at one pair of electrodes 9, 9' transmitted along the beam through the piezoelectric layer 7, and picked up at the second electrode pair 9, 9' in known manner. For waves of small amplitude compared to the beam dimensions the time of travel of the waves between the two electrodes depends linearly on their separation, which will vary as the beam deflects.

A signal generator and receiver of suitable high frequency are connected to the two electrode pairs together with means for timing the transit time along the beam. The connections are formed as strips (not shown) deposited at the same time as the electrode. In the absence of any feedback force the measured transit time provides an indication of path length and thus of bending force and acceleration.

As mentioned above, the non-linearities accompanying measurement on a deflected beam can be overcome to a large extent by the use of force feedback to maintain the beam (nearly) in its undeflected condition. In the embodiment of FIG. 7 this is achieved with the aid of the piezoelectric layer 7 which carries the acoustic wave. This layer 7 is deposited on a ground plane 11, of gold on nichrome, which is deposited directly on the silicon beam surface.

A metallic electrode layer 13 is deposited on the piezoelectric layer 7 between the SAW electrodes 9 and 01 so sandwiching the piezoelectric layer between it and the ground plane. Connections (not shown) to the ground plane and the electrode 13 are made at the support end of the beam again by standard integrated circuit techniques.

The application of a DC voltage between the electrode 13 and the ground plane 11 induces compressive or tensile forces longitudinally in the piezoelectric layer 7, the direction of the force depending upon the polarity of the applied voltage. This force can be made to counteract the acceleration-induced deflection to a considerable extent.

The voltage applied to the electrodes 13/7 is derived from a feedback path as the amplified output of the difference between a signal derived from the transit time measurement and a reference transit time corresponding to zero deflection, the polarity of this output signal being such as to counteract the original deflection.

The feedback signal gives a direct indication of the deflection that would have arisen in a linear system and is thus a measure of the acceleration.

However, even with a very large gain in the feedback loop there is a limit to the deflection correction that is attainable since the correction is being applied in only one surface. A piezoelectric layer on both upper and lower surfaces of the beam would be necessary to improve the compensation further but this would be difficult because of the rough etched surface underneath and would also introduce correction complications. The performance of the design of FIG. 7 is nevertheless very satisfactory for most purposes.

Changes of temperature, resulting in differential expansion between piezoelectric layer and beam, may have a deleterious effect on the performance but not essentially since it has been shown that the acoustic wave velocity can vary with temperature in such a way as to counteract the differential effect. Alternatively, the electrode 13 may be coated with a material having a coefficient of expansion such as to counteract the differential effect. In a further alternative a dummy piezoelectric coating may be applied to the underneath of the beam to provide a balanced differential effect.

In a variation of the FIG. 7 design the SAW transmitting and receiving electrodes may be duplicated in an adjacent path along the beam the positions of the transmitter and receiver in the second path being reversed so that a signal generated at the support end of the beam travels along the beam to the far receiving electrodes, is there coupled to the adjacent transmitting electrodes and is then re-transmitted back to the receiver at the support end. In this way connections to the SAW electrodes extend only to the transmitter and receiver at the support end.

Figure 8:
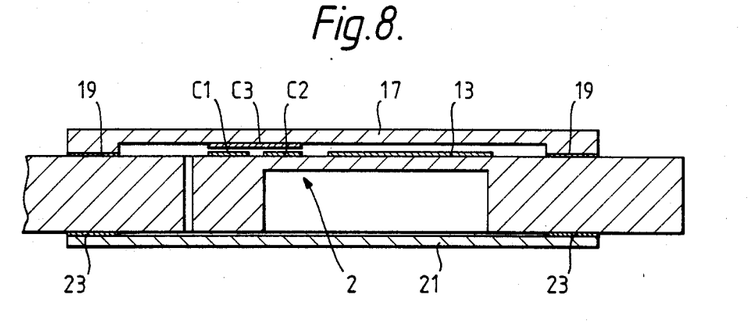
FIG. 8 shows a longitudinal section of a beam employing electrostatic (capacitive) sensing, piezoelectric force feedback and cover plate end stops.
Figure 9:
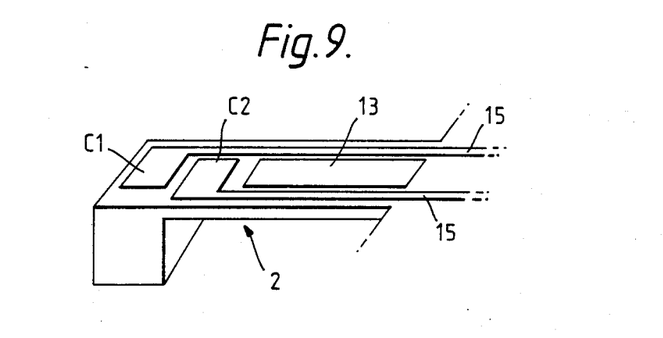
FIG. 9 shows a perspective view of the beam of FIG. 8.

FIGS. 8 and 9 show an alternative, electrostatic or capacitive, method of measuring deflection directly as opposed to the above SAW method for measuring the lengthening resulting from deflection.

A beam 2 has two capacitor plates C1 and C2 deposited upon its upper surface and connected by deposited strips 15 to an oscillator (not shown). The plates C1 and C2 are not coupled directly to each other but by way of a 'floating' plate C3 which forms a capacitor with each of them and thus provides two capacitors in series. The plate C3 is mounted on a silicon cover plate 17 of the accelerometer, the cover plate 17 being bonded to the silicon wafer by a glass electrostatic bond 19.

A lower cover plate 21 is similarly electrostatically glass bonded to the underside of the silicon wafer, the clearance between this cover plate 21 and the lower face of the offset mass 3 being provided merely by the thickness of the glass bond 23. In operation, subject to feedback forces this minimal clearance is sufficient, as is the clearance on the upper face provided by the capacitor gap C1/C3, since the beam is maintained substantially in its rest position by the feedback force.

The feedback is again provided, as in FIG. 7, by a feedback voltage applied to the electrode 13 which is deposited on a piezoelectric layer 7 and a metal ground plane 11, the latter two layers not being shown in FIGS. 8 and 9 for simplicity.

The series capacitor arrangement of C1, C2 and Ce means that no leads have to be taken out on the cover plate, they can be accommodated as part of the deposited circuit layer on the beam surface. The capacitor is connected as the frequency controlling component of an oscillator, the frequency of which is a function of the capacitor plate separation. If the capacitor arrangement C1,C2,C3 is duplicated, the two capacitors so formed may constitute arms of a Wien Bridge oscillator. In this case the frequency is a function of the root of the product of the two capacitances and thus, it may be shown, a linear function of the capacitor plate separation.

The frequency in the rest position, i.e. the zero acceleration condition, is determined and by differencing with this value, an error signal is determined which is converted to a controlling feedback signal for application to the electrode 13 thus opposing the beam deflection.

When the accelerometer is un-powered—when it is being transported, for example—there is, of course, no feedback force and the beam inertia may make it vulnerable to damage from shock movements and large deflections. The cover plates 17 and 21 of FIG. 8 form 'end-stops' serving to limit such movement and prevent damage. Gas is trapped by the bonded cover plates and provides an additional measure of damping.

Figures 10A, 10B:
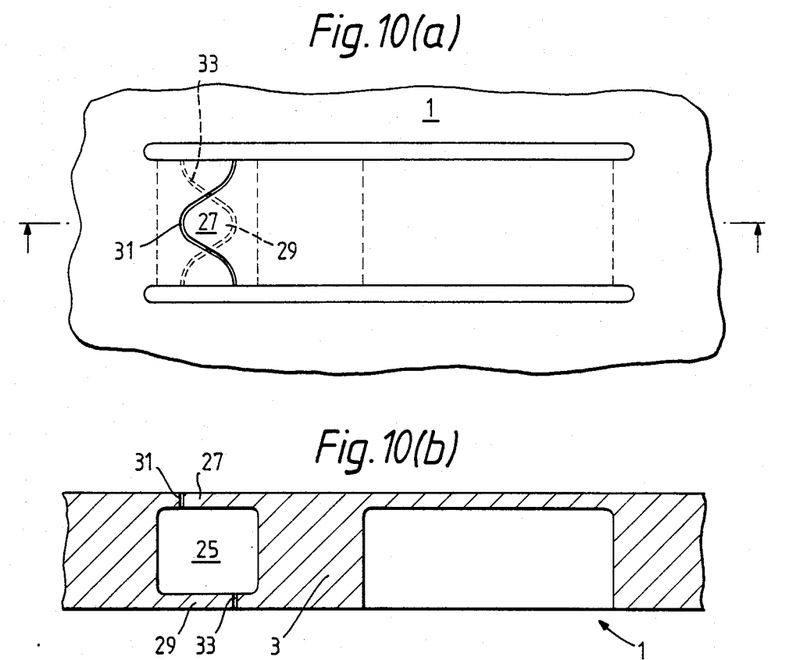

FIGS. 10 (a) and (b) show an alternative form of end stop. When the beam is initially etched from the wafer 1, a wide cavity 25 is etched out between the upper and lower surfaces at the free end of the beam. The upper and lower leaves 27 and 29 thus formed are cut through to leave the beam floating free, but at positions 31 and 33 which are out of register. An extension of the upper leaf 27 will thus overlie an extension of the lower leaf 29. Thus an uncontrolled deflection of the beam downwards will be limited by this integral end-stop to a movement equal to the wafer thickness. The severing cuts 31 and 33 are serpentine, as shown in FIG. 10(a), so that the outer portions similarly limit upward movement of the beam. This modification is not, of course, suitable for the capacitance sensing system of FIGS. 8 and 9, or at least, not for upward movement of the beam.

Figure 11:
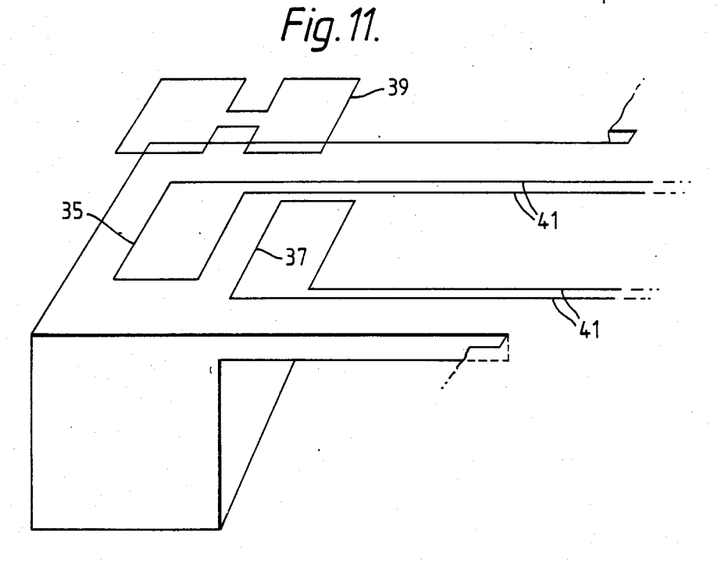
FIG. 11 shows a perspective view of a beam employing electrodynamic (inductive) sensing.

FIG. 11 shows the electromagnetic equivalent of the capacitor system above. Two spiral coils 35, 37 (shown for simplicity as single turns) are deposited on the beam surface and a single two-part coil 39 is deposited on the cover plate (not shown but as 17 in FIG. 8). As the beam deflects, the magnetic coupling varies and the variation is used to provide a measure of beam deflection. Again, the intermediate coupling member 39 permits corrections 41 to be entirely on the beam surface, and variation of coupling is arranged to provide a frequency variation as for the capacitive case.

Various modifications can be made to the accelerometer to adapt it for specific requirements, and in particular according to the degree of accuracy required. When the beam is distorted by acceleration the sensitivity of the accelerometer changes as its response becomes non-linear. As explained above, force feedback may be used to maintain the initial geometry, giving high accuracy, and a linear response. The force feedback is used to reduce the deflection signal to practically zero. With a capacitive or inductive system deflection is sensed so force feedback substantially maintains the initial geometry. With surface acoustic wave sensing, what is sensed is the strain in the top of the beam, force feedback corrects the strain to its initial value, but does not quite eliminate beam deflection. As described above, for all these cases feedback can be provided by a layer of piezoelectric material (e.g. ZnO) on the level surface of the beam. To produce a high quality deposit with good piezoelectric properties the zinc oxide crystals should grow normal to the surface and should form a continuous layer. This can best be achieved on a flat surface, as in FIGS. 7–11, but good deposits can also be formed where the surface is curved, provided the radius of curvature is large compared with the deposit thickness.

It is therefore possible to refine the performance of the accelerometer without the need to form a piezoelectric layer on the irregular lower surface, which would, at best, be extremely difficult.

Strain distribution varies with position along the beam so in a perfect system the feedback force should vary similarly. In principle this can be achieved by applying a fixed voltage to an electrode whose width varies along the beam. The strain distribution also varies according to the direction of acceleration, but two sets of electrodes, one for vertical and one for horizontal, would require a large surface area with surfaces in, and normal to, the plane of the wafer. A partial solution to these complicating difficulties can be reached by selecting a compromise electrode shape and by slight modifications of the beam cross-section. Thus the beam surface maybe etched away along outer longitudinal strips to provide a central ridge, thus sections of the surface which are at different distances from the neutral axis, and more controllable feedback bending moments. Small deviations from perfect flatness still allow a continuous zinc oxide layer to be deposited, but, for a small beam depth b (see FIG. 2(b)), such deviations result in a significant variation in the distance of the layer 7 from the beam's axis. Two electrodes are deposited on the zinc oxide at different distances from the axis, one on the ridge and one on the outer portions, and different voltages applied to them to produce a wide range of combinations of direct stress and bending moment. Manufacture is more complicated because of additional masking and etching operations required to define the beam shape, but all deposition still takes place only on one face.

The accelerometer could be made without force feedback. In this case deflection could be measured by forming piezo resistors in the top of the beam using a suitable dopant, and connecting these resistors in a bridge formation. This approach would be cheap but would tend to give poor accuracy, because the piezo resistors are temperature sensitive, and it is difficult to control their values.

Devices have been described above using the same effect for both sensing and feedback (piezoelectric, in FIG. 7) and different effects, i.e. a hybrid device. Thus the device of FIGS. 8 and 9 employs electrostatic (capacitive) sensing and piezoelectric feedback, while FIG. 11 illustrates electrodynamic sensing and piezoelectric feedback. While piezoelectric feedback has been found the most practical, devices using the other effects for both sensing and feedback, or a combination of the two, are also viable.

I claim:

1. An accelerometer, comprising:
   (a) at least three cantilever mounted beams, each of said beams having a length and a width and each of said beams having a longitudinal surface extending along said length and across said width,
   (b) a common plane containing said longitudinal surface of each beam,
   (c) a sensing axis of each said beam, each said beam having a greater response to acceleration along the respective sensing axis than to acceleration along any other axis of said beam,
   (d) each said beam having a mass distribution along a line normal to said longitudinal surface to cause said sensing axis to be inclined to said common plane,
   (e) said beams being oriented in said common plane to cause the inclined sensing axes to be aligned with a set of coordinate axes, and
   (f) sensing means in respect of each said beam for determining acceleration-induced beam deflection.

2. An accelerometer according to claim 1, wherein said beam are integral parts of a semiconductor wafer, one surface of said wafer lying in said common plane.

3. An accelerometer according to claim 2, wherein each beam comprises a support-end section and a substantially thicker free-end section.

4. An accelerometer according to claim 2, wherein each said beam comprises a support-end section and a free-end section of substantially greater width across said longitudinal surface, said greater width providing a greater offset in said mass distribution with predetermined thickness.

5. An accelerometer according to claim 2, wherein there are three of said beams.

6. An accelerometer according to claim 5, wherein said co-ordinate axes are mutually orthogonal.

7. An accelerometer according to claim 1, wherein said sensing means comprises, in respect of each said beam, and means for transmitting a surface acoustic wave along said longitudinal surface, and means for timing the transmission of said surface acoustic wave and determining a change in the time of transmission resulting from a change in length of said longitudinal surface resulting from deflection of the said beam.

8. An accelerometer according to claim 7, wherein said means for transmitting a surface acoustic wave comprises a layer of piezoelectric material deposited on said longitudinal surface, a transmitting electrode system and a receiving electrode system spaced apart along said longitudinal surface to define a surface acoustic wave path.

9. An accelerometer according to claim 8, including, in respect of each said beam, two surface acoustic wave paths side by side along said longitudinal surface, the two paths being oppositely directed and the two electrode systems toward the free end of the beam being coupled together to provide two paths in series and having terminal electrode systems toward the support end of the beam.

10. An accelerometer according to claim 1, wherein said sensing means comprises, in respect of each said beam, a capacitor electrode mounted on said longitudinal surface, a fixedly mounted capacitor electrode, and means responsive to the capacitance between said electrodes.

11. An accelerometer according to claim 10, wherein said sensing means comprises, in respect of each beam, two capacitor electrodes mounted on said longitudinal surface and a fixedly mounted capacitor electrode confronting the beam mounted capacitor electrodes to permit capacitor connections to be solely on the beam surface.

12. An accelerometer according to claim 1, wherein said sensing means comprises, in respect of each said beam, an inductive coil mounted on said longitudinal surface, a fixedly mounted inductive coil confronting the beam mounted coil, and means responsive to the electromagnetic coupling between said coils.

13. An accelerometer according to claim 12, wherein said sensing means comprises, in respect of each said beam, two inductive coils mounted on said longitudinal surface and a fixedly mounted closed inductive coil confronting the beam mounted inductive coils to permit coil connections to be solely on the beam surface.

14. An accelerator according to claim 1 including force feedback means associated with each said beam responsive to said sensing means to ten to maintain zero deflection of the associated beam, an output signal from said force feedback means providing an indication of acceleration.

15. An accelerometer according to claim 14, wherein said force feedback means comprises, in respect of each said beam, a composite deposited on said longitudinal surface, said composite deposited comprising a first electrode layer, a layer of piezoelectric material and a second electrode layer, and means for applying a potential difference between said first and second electrodes such as to impose a longitudinal stress on said longitudinal surface to oppose stress imposed by acceleration-induced deflection of the beam.

16. An accelerometer according to claim 15, wherein said longitudinal surface lies between recessed longitudinal portions of the beam surface, said layer of piezoelectric material extending over said longitudinal surface and said recessed longitudinal portions and wherein a third electrode is deposited on said recessed portions, said third electrode being isolated from said second electrode to permit different potential differences to be imposed between said first and second electrodes and said first and third electrodes.

17. An accelerometer according to claim 15 wherein said second electrode is composed of a material having such an expansion coefficient as to produce a differential expansion with said longitudinal surface opposed to that produced between said piezoelectric layer and said longitudinal surface.

18. An accelerometer according to claim 15, wherein a layer of piezoelectric material on the surface of said beam opposite to said longitudinal layer provides a balancing differential expansion force and substantially zero deflection of the beam with temperature change.

19. An accelerometer according to claim 14, wherein said force feedback means comprises, in respect of each beam, a capacitor electrode mounted on said longitudinal surface, a fixedly mounted capacitor electrode and means for applying a potential difference between said capacitor electrodes.

20. An accelerometer according to claim 14, wherein said force feedback means comprises, in respect of each beam, an inductive coil mounted on said longitudinal surface, a fixedly mounted inductive coil and means for energising said inductive coils.

21. An accelerometer according to claim 2, wherein, on each side of said semiconductor wafer a cover plate is bonded to said semiconductor wafer so as to cover at least one said beam, each said cover plate being spaced from the associated surface of the beam by a distance smaller than the thickness of the wafer.

22. An accelerometer according to claim 2, wherein each said beam has leaf portions extending from its opposite surfaces towards the adjacent body of said semiconductor wafer, deflection of a said beam out of said wafer being limited by obstruction between a said leaf portion and said body of semiconductor wafer.

* * * * *